United States Patent

Pfaendtner et al.

(10) Patent No.: US 6,533,875 B1
(45) Date of Patent: *Mar. 18, 2003

(54) PROTECTING A SURFACE OF A NICKEL-BASED ARTICLE WITH A CORROSION-RESISTANT ALUMINUM-ALLOY LAYER

(75) Inventors: Jeffrey Allan Pfaendtner, Blue Ash, OH (US); Joseph David Rigney, Milford, OH (US); Michael James Weimer, Loveland, OH (US)

(73) Assignee: General Electric Co., Cincinnati, OH (US)

(*) Notice: Subject to any disclaimer, the term of this patent is extended or adjusted under 35 U.S.C. 154(b) by 36 days.

This patent is subject to a terminal disclaimer.

(21) Appl. No.: 09/693,077

(22) Filed: Oct. 20, 2000

(51) Int. Cl.$^7$ .................................................. B05D 7/22
(52) U.S. Cl. ...................... 148/535; 427/181; 427/192; 427/226; 427/239
(58) Field of Search .......................... 148/535; 427/181, 427/192, 226, 239

(56) References Cited

U.S. PATENT DOCUMENTS

| | | | | |
|---|---|---|---|---|
| 4,241,113 A | * | 12/1980 | Martinengo et al. | 427/229 |
| 4,347,267 A | * | 8/1982 | Baldi | 427/237 |
| 5,807,428 A | * | 9/1998 | Bose et al. | 106/14.05 |
| 5,958,204 A | * | 9/1999 | Creech et al. | 204/487 |
| 6,165,283 A | * | 12/2000 | Bayer et al. | 148/200 |
| 6,273,678 B1 | * | 8/2001 | Darolia | 415/200 |
| 6,283,714 B1 | * | 9/2001 | Rigney et al. | 416/241 |
| 6,299,935 B1 | * | 10/2001 | Park et al. | 427/181 |

* cited by examiner

Primary Examiner—George Wyszomierski
Assistant Examiner—Janelle Combs Morillo

(57) ABSTRACT

A surface of a nickel-base article such as an internal surface of a gas turbine airfoil is protected with a donor layer of aluminum and at least one other element. To form the protective layer, a donor alloy is contacted to the protected surface of the article, and simultaneously the article and the donor alloy are heated to a coating temperature that is greater than about 0.7 of the absolute solidus temperature of the donor alloy but is such that the donor alloy remains in the form of a condensed phase contacting the protected surface of the article. The donor alloy is thereafter interdiffused into the protected surface of the article.

22 Claims, 3 Drawing Sheets

PROTECTING A SURFACE OF A NICKEL-BASED ARTICLE WITH A CORROSION-RESISTANT ALUMINUM-ALLOY LAYER

FIELD OF THE INVENTION

This invention relates to the protection of nickel-base articles with aluminum-alloy surface protective layers and, more particularly, to the protection of the internal surfaces of gas turbine airfoils.

BACKGROUND OF THE INVENTION

In an aircraft gas turbine (jet) engine, air is drawn into the front of the engine, compressed by a shaft-mounted compressor, and mixed with fuel. The mixture is burned, and the hot exhaust gases are passed through a turbine mounted on the same shaft. The flow of combustion gas turns the turbine by impingement against an airfoil section of the turbine blades and vanes, which turns the shaft and provides power to the compressor and fan. In a more complex version of the gas turbine engine, the compressor and a high pressure turbine are mounted on one shaft, and the fan and low pressure turbine are mounted on a separate shaft. In any event, the hot exhaust gases flow from the back of the engine, driving it and the aircraft forwardly.

The hotter the combustion gases, the more efficient is the operation of the jet engine. There is thus an incentive to raise the combustion gas temperature. The maximum temperature of the combustion gas is normally limited by the materials used to fabricate the turbine vanes and turbine blades of the turbine, upon which the hot combustion gases impinge. In current engines, the turbine vanes and blades are made of nickel-based superalloys, and can operate at temperatures of up to about 1900–2150° F.

Many approaches have been used to increase the operating temperature limits of the airfoil portions of turbine blades and vanes to their current levels. For example, the composition and processing of the base materials themselves have been improved, and a variety of solidification techniques have been developed to take advantage of oriented grain structures and single-crystal structures.

Physical cooling techniques may also be used. In one technique, internal cooling passages are present in the interior of the turbine airfoil. Air is forced through the internal cooling passages and out openings at the external surface of the airfoil, removing heat from the interior of the airfoil and, in some cases, providing a boundary layer of cooler air at the surface of the airfoil.

In combination with the above approaches, coatings and protective surface layers are used to inhibit corrosion and oxidation of the external and internal surfaces of the turbine airfoils. For example, the surfaces of the internal cooling passages may be protected with a diffusion aluminide coating, which oxidizes to an aluminum oxide protective scale that inhibits further oxidation of the internal surfaces. A number of techniques for applying the aluminum coating that forms the internal diffusion aluminide protective layer are known, including chemical vapor deposition, vapor-phase aluminiding, and above-the-pack techniques.

In the studies leading to the present invention, the inventors have recognized that it would be desirable to co-deposit other elements with the aluminum to improve the oxidation and/or corrosion resistance of the protective layer. The available deposition approaches have the drawback that it is difficult to apply alloys, containing modifying elements in addition to the aluminum, to the internal surfaces with good control over the compositions of the alloys. Consequently, the available processes have been directed primarily toward applying simple diffusion aluminides rather than more-complex diffusion aluminide alloys that take advantage of the beneficial effects of alloying elements co-deposited with the aluminum.

There is therefore a need for an improved approach to the depositing of aluminum-containing protective layers on specific areas of surfaces, particularly the internal surfaces of articles such as gas turbine airfoils. The present invention fulfills this need, and further provides related advantages.

BRIEF SUMMARY OF THE INVENTION

The present invention provides a method for protecting surfaces of articles such as gas turbine airfoils made of nickel-base superalloys. The approach permits the composition of a protective layer applied to protected surfaces to be established by varying the alloy content of a condensed-phase alloy, rather than relying on the difficult-to-control properties of a vapor phase. Consequently, complex diffusion aluminide protective layers may be applied to protected surfaces, taking advantage of the beneficial properties introduced by the alloying elements. The present approach is readily used to prepare both internal and external protected surfaces, although its greatest benefits are realized when internal surfaces are protected.

A method for protecting a surface of an article includes furnishing an article made of a nickel-base alloy. A donor alloy of aluminum and at least one other element is provided and applied onto the protected surface of the article. The step of applying includes the steps of contacting the donor alloy to the protected surface of the article, and simultaneously heating the article and the donor alloy to a coating temperature that is greater than about 0.7 of the absolute solidus temperature but is such that the donor alloy remains in the form of a condensed phase contacting the protected surface of the article. The coating temperature is preferably from about 1700° F. to about 2100° F. The donor alloy is thereafter partially or completely interdiffused into the protected surface of the article. The interdiffusion is continued for as long as necessary to achieve a desired degree of interdiffusion, but typically occurs over a period of from about 1 to about 10 hours at the coating temperature.

The article of the most current interest is a component of a gas turbine engine such as a gas turbine airfoil. While both internal and external surfaces may be protected, the internal protected surfaces are of the most interest because it is more difficult to protect them with coatings and protective layers due to the absence of a line-of-sight access to the internal protected surfaces from other types of coating sources.

The alloy of aluminum includes at least one other element, examples being chromium, zirconium, hafnium, yttrium, cerium, platinum, and palladium, and mixtures thereof. Some specific examples are aluminum plus chromium in an amount of less than about 30 percent by weight of the alloy; aluminum plus platinum in an amount of less than about 64 percent by weight of the alloy; aluminum plus palladium in an amount of less than about 60 percent by weight of the alloy; aluminum plus zirconium in an amount of less than about 50 percent by weight of the alloy; aluminum plus hafnium in an amount of less than about 69 percent by weight of the alloy; aluminum plus yttrium in an amount of less than about 60 percent by weight of the alloy; and aluminum plus cerium in an amount of less than about 40 percent by weight of the alloy. Melting-point depressants such as silicon may also be included in the alloy. In the case of the preferred silicon melting-point depressant, the silicon content of the alloy is preferably less than about 20 percent by weight of the alloy. A particular advantage of the present approach is that donor alloys of more than two elements are readily prepared and used, as distinct from vapor deposition techniques where there is great difficulty in controllably depositing two or more elements simultaneously.

The alloy may be transported to the surface of the article to be protected by any operable approach. Examples are slurries and foams.

The present approach differs from conventional aluminiding techniques used for internal surfaces, where the aluminum is transported over relatively long distances from a source to the surface via the vapor phase. The vapor source may be several inches away from the surface to be protected, while in the present case the condensed-phase donor alloy is in direct physical contact with the surface to be protected. The relative rates of vapor transport of different elements, such as the aluminum and the alloying element(s), is difficult to regulate to achieve consistent compositions. Instead, in the present approach the donor alloy source of the aluminum and the one or more alloying element(s) is in a condensed phase in direct physical contact with the surface to be protected, preferably in the form of a continuous or discontinuous layer of the donor alloy on the substrate surface. As used herein, a "condensed phase" is a solid, liquid, or mixture of solid and liquid, but not a vapor. In most cases substantially all of the donor alloy, including both the aluminum and the alloying element(s), is diffused into the protected surface, so that the amount of all of the elements that are introduced from the external source is known with certainty. It is recognized that there may be some incidental vaporization and subsequent redeposition of the donor alloy because there is a vapor pressure of the elements at the coating temperature, but the dominant mode of movement of the elements of the donor alloy to the protected surface is solid-state and/or liquid-state diffusion in the donor alloy, and solid-state diffusion in the nickel-base alloy.

The coating temperature is in excess of about 0.7 of the absolute solidus temperature of the donor alloy, but it may not be so high that the donor alloy is no longer in the condensed phase. (The ratio of a temperature measured on an absolute scale to the solidus temperature of an alloy measured on an absolute scale is sometimes termed the "homologous temperature", and in this case the coating temperature is at a temperature in excess of a homologous temperature of about 0.7.) The coating temperature may be in excess of the solidus temperature of the donor alloy, so that at least some liquid phase is present. It is critical that the donor alloy remain primarily in the condensed phase (i.e., a solid, liquid, or mixture of liquid and solid) in contact with the protected surface being treated.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
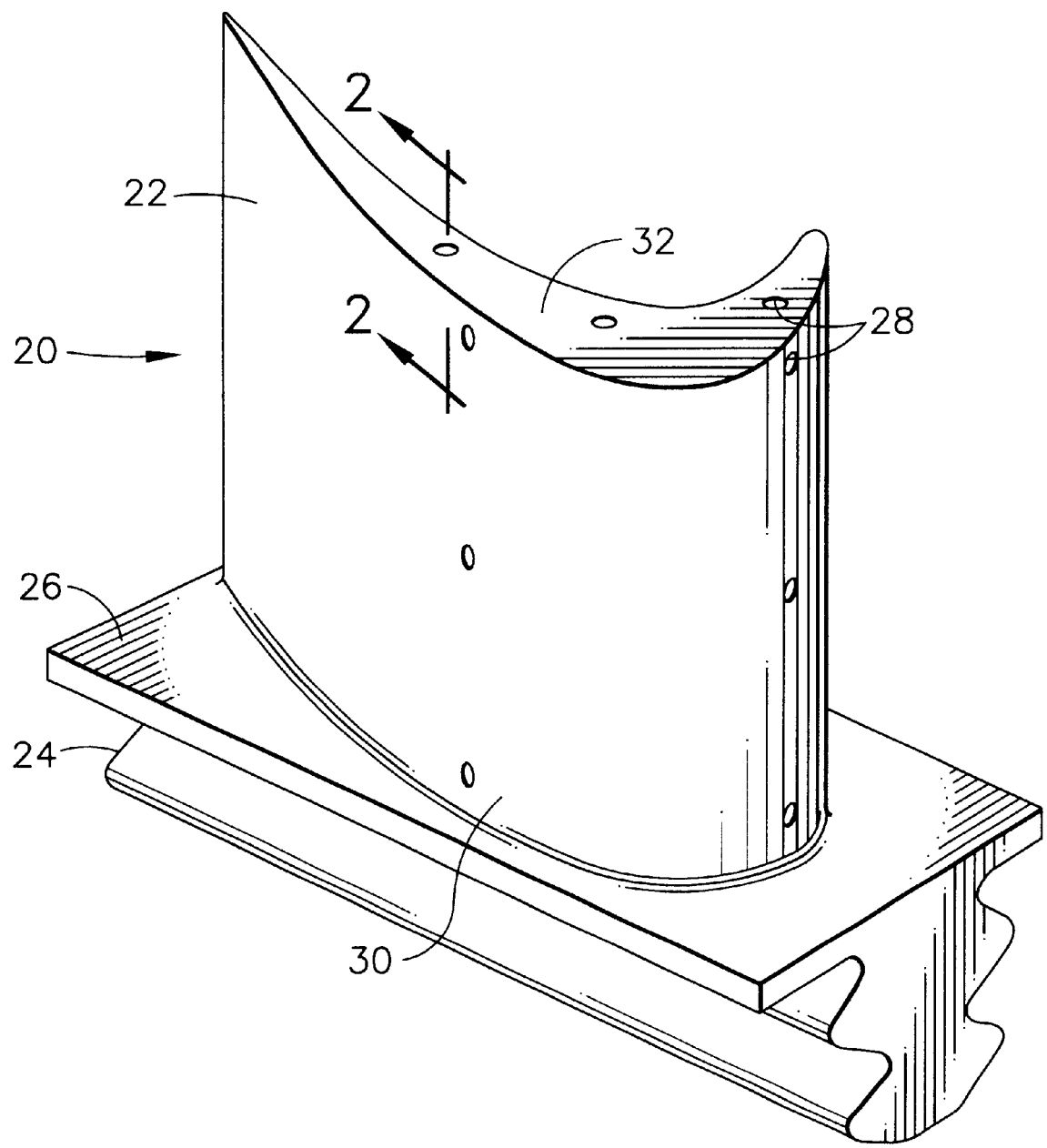
FIG. 1 is a perspective view of a turbine blade.

FIG. 1 depicts a component article of a gas turbine engine such as a turbine blade or turbine vane, and in this illustration a turbine blade 20. The turbine blade 20 is formed of any operable material, but is preferably a nickel-base superalloy. The turbine blade 20 includes an airfoil section 22 against which the flow of hot exhaust gas is directed. (The turbine vane has a similar appearance in respect to the pertinent airfoil section, but typically includes other end structure to support the airfoil.) The turbine blade 20 is mounted to a turbine disk (not shown) by a dovetail 24 which extends downwardly from the airfoil 22 and engages a slot on the turbine disk. A platform 26 extends longitudinally outwardly from the area where the airfoil 22 is joined to the dovetail 24. A number of internal passages extend through the interior of the airfoil 22, ending in openings 28 in the surface of the airfoil 22. During service, a flow of cooling air is directed through the internal passages to reduce the temperature of the airfoil 22. The airfoil 22 may be described as having a root end 30 adjacent to the dovetail 24, and an oppositely disposed tip end 32 remote from the dovetail 24.

Figure 2:
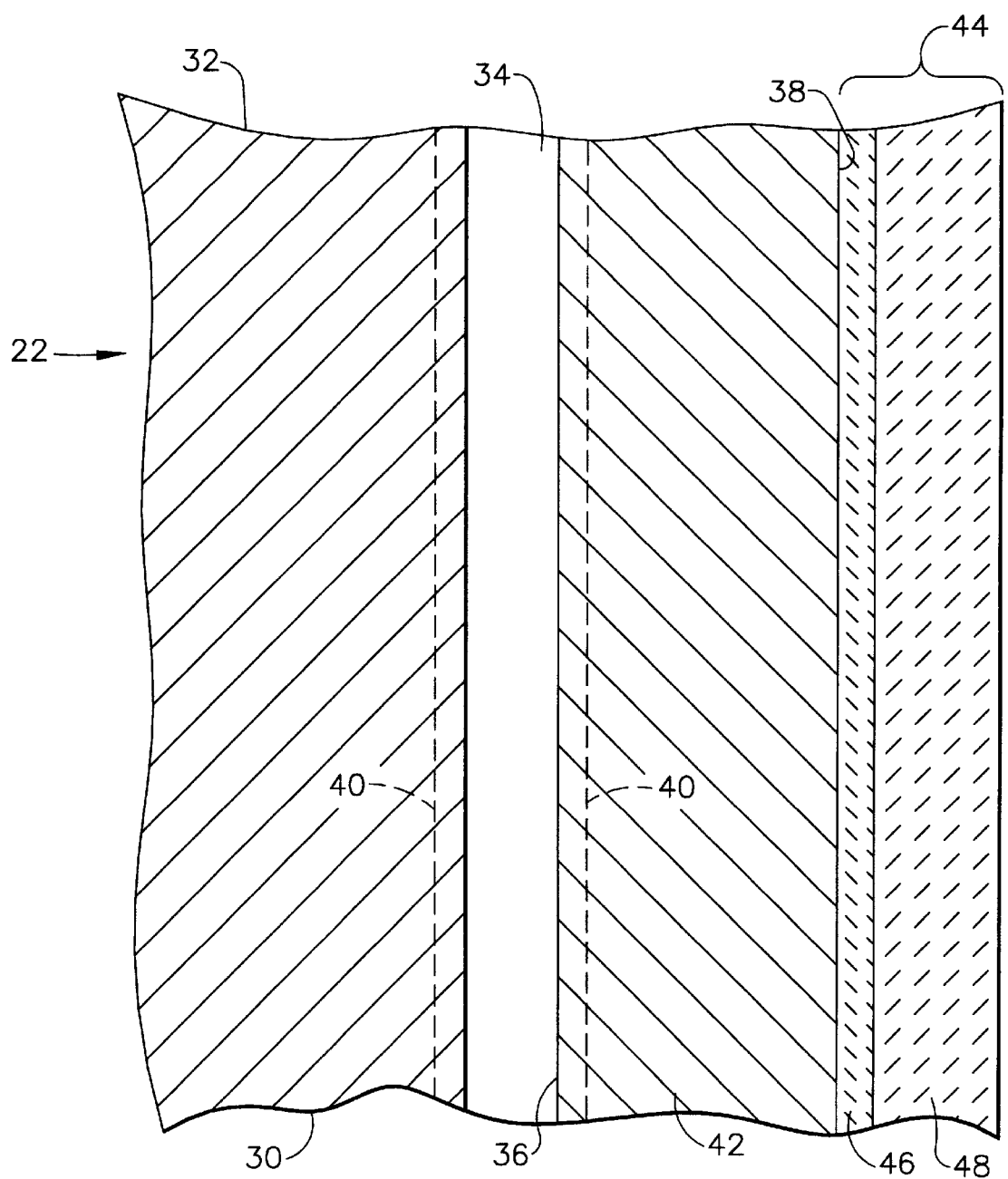
FIG. 2 is an enlarged schematic sectional view through the turbine blade of FIG. 1, taken on lines 2—2.

FIG. 2 is a longitudinal section through the airfoil 22, showing one of the internal passages 34 extending through an interior of the airfoil 22. The internal passage 34 has an internal airfoil surface 36, and there is also an external airfoil surface 38 of the metallic portion of the airfoil 22.

A protective region 40 is present at the internal airfoil protected surface 36. The protective region 40 is formed by depositing a donor alloy of aluminum and at least one other element onto the internal airfoil protected surface 36, so that a body of the airfoil 22 serves as a substrate 42. (The term "protected surface" is used to indicate a surface that either has been protected or is to be protected by the formation of the protective region, but prior to the time that it is protected.) The donor alloy is typically deposited in the form of a solid or liquid layer in contact with the protected surface. The at least one other (alloying) element may be, for example, chromium, zirconium, hafnium, yttrium, cerium, platinum, and palladium, and mixtures thereof, or any other operable element that may be applied by the techniques discussed subsequently. The deposited donor alloy is interdiffused with the material of the substrate 42 to form the protective region 40 lying below the internal airfoil protected surface 36. In most instances, the protective region 40 has a composition with the concentration of aluminum and at least one other element from the donor alloy highest near the internal airfoil protected surface 36, and decreasing with increasing distance into the substrate 42 from the internal airfoil protected surface 36. The modified diffusion aluminide protective region 40 is typically from about 0.0005 to about 0.005 inch thick. When exposed to a high-temperature oxidizing environment, the aluminum-enriched region at the internal airfoil protected surface 36 oxidizes to form a highly adherent aluminum oxide ($Al_2O_3$) protective scale at the internal airfoil protected surface 36, inhibiting and slowing further oxidation damage. The at least one other element modifies and improves the oxidation and/or corrosion resistance afforded by the protective region 40. An overlay coating such as discussed later and applied to the external airfoil surface 38 is not used on the internal airfoil protected surface 36, because there is known no suitable deposition technique.

The external airfoil surface 38 may also be protected, and FIG. 2 illustrates one approach. A protective coating 44 overlies and contacts the external airfoil surface 38. The protective coating 44 has a protective layer 46 overlying and contacting the external airfoil surface 38. The protective layer 46 is preferably formed of a diffusion aluminide or an overlay composition. When used, the diffusion aluminide may be a simple diffusion aluminide or a modified diffusion aluminide such as that discussed above in relation to the protective region 40. When used, the overlay protective coating is preferably of the MCrAlX type. The terminology "MCrAlX" is a shorthand term of art for a variety of families of overlay protective layers 46 that may be employed as environmental coatings or bond coats in thermal barrier coating systems. In this and other forms, M refers to nickel, cobalt, iron, and combinations thereof. In some of these protective coatings, the chromium may be omitted. The X denotes elements such as hafnium, zirconium, yttrium, tantalum, rhenium, ruthenium, palladium, platinum, silicon, titanium, boron, carbon, and combinations thereof. Specific compositions are known in the art. Some examples of MCrAlX compositions include, for example, NiAlCrZr and NiAlZr, but this listing of examples is not to be taken as limiting. The protective layer 46 is from about 0.0005 to about 0.010 inch thick. Such protective layers 46 are generally known in the art.

Optionally, a ceramic layer 48 overlies and contacts the protective layer 46. The ceramic layer 48 is preferably yttria-stabilized zirconia, which is zirconium oxide containing from about 2 to about 20 weight percent, preferably from about 3 to about 8 weight percent, of yttrium oxide. The ceramic layer 48 is typically from about 0.003 inch to about 0.010 inch thick. Other operable ceramic materials may be used as well. When there is no ceramic layer 48 present, the protective layer 46 is termed an "environmental coating". When there is a ceramic layer 48 present, the protective layer 46 is termed a "bond coat".

Figure 3:
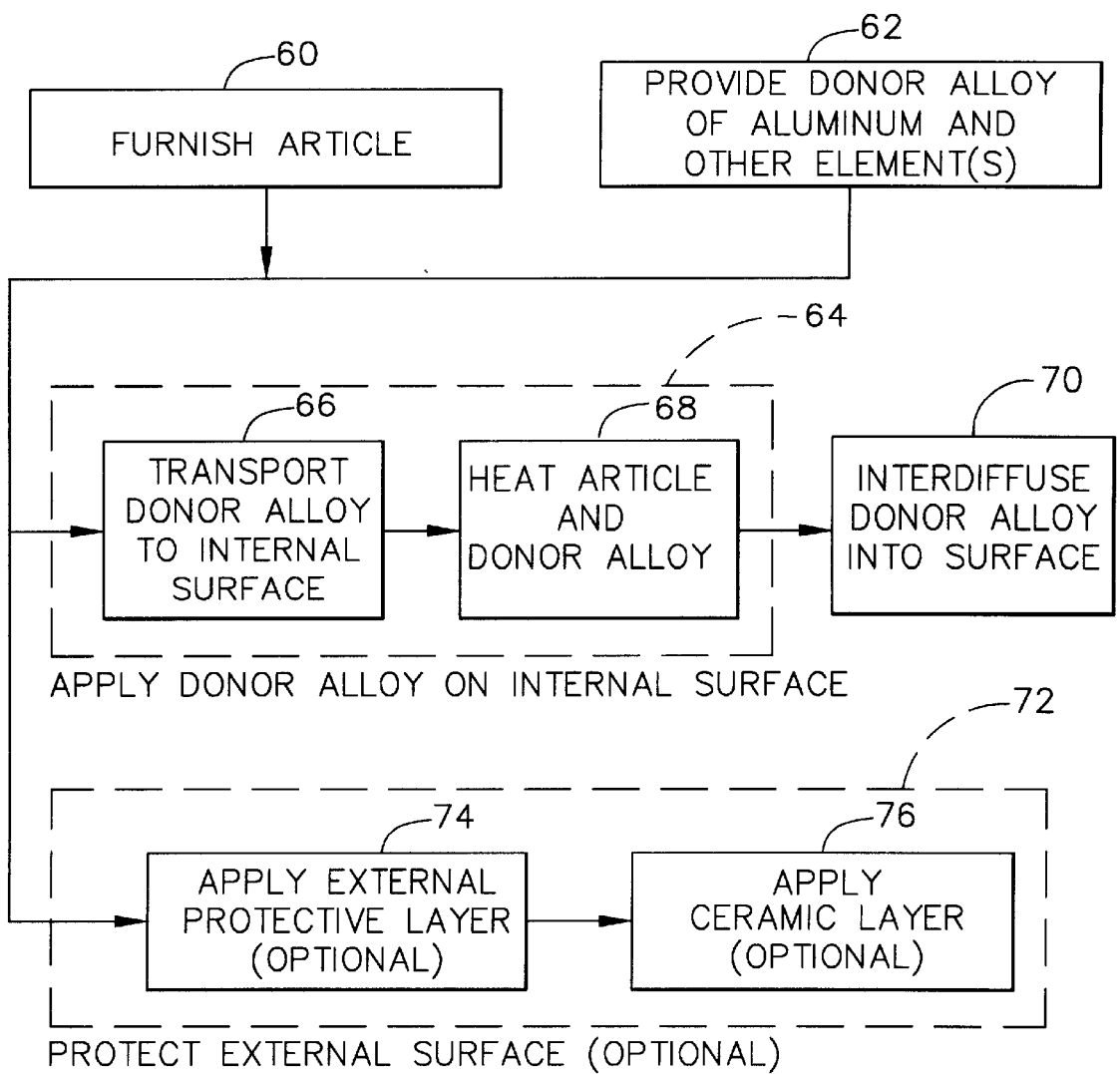
FIG. 3 is a block flow diagram of an approach for preparing an internally coated gas turbine airfoil.

FIG. 3 depicts a preferred approach for practicing the present method. An article is furnished, numeral 60, in this case an airfoil section 22 such as found in the turbine blade 20 or in a turbine vane. The article is furnished by any operable approach. In the case of a turbine blade airfoil, the turbine blade is solidified with internal passages 34, or it may be solidified as a solid piece and the internal passages may be machined into the solid piece, or a combination of approaches may be used.

The article is made of a nickel-base alloy. As used herein, "metal-base" means that the composition has more of the named metal present than any other element. For example, a nickel-base alloy has more nickel than any other element. The nickel-base alloy may additionally be a nickel-base superalloy, meaning that it is of a composition which is strengthened by the precipitation of gamma-prime or a related phase. A typical nickel-base alloy has a composition, in weight percent, of from about 1 to about 25 percent cobalt, from about 1 to about 25 percent chromium, from about 0 to about 8 percent aluminum, from 0 to about 10 percent molybdenum, from about 0 to about 12 percent tungsten, from about 0 to about 12 percent tantalum, from 0 to about 5 percent titanium, from 0 to about 7 percent rhenium, from 0 to about 6 percent ruthenium, from 0 to about 4 percent niobium, from 0 to about 0.2 percent carbon, from 0 to about 0.15 percent boron, from 0 to about 0.05 percent yttrium, from 0 to about 1.6 percent hafnium, balance nickel and incidental impurities.

A donor alloy of aluminum and at least one other (alloying) element is provided, numeral 62. The at least one other element is any element selected to improve the properties of the protective region 40 in the final product after subsequent processing. Examples of the at least one other element of most interest include chromium, zirconium, hafnium, yttrium, cerium, platinum, and palladium, and mixtures thereof. More preferably, examples include a donor alloy comprising aluminum and chromium in an effective amount of less than about 30 percent by weight of the donor alloy; a donor alloy comprising aluminum and platinum in an effective amount of less than about 64 percent by weight of the donor alloy, a donor alloy comprising aluminum and palladium in an effective amount of less than about 60 percent by weight of the donor alloy; a donor alloy comprising aluminum and zirconium in an effective amount of less than about 50 percent by weight of the donor alloy; a donor alloy comprising aluminum and hafnium in an effective amount of less than about 69 percent by weight of the donor alloy; a donor alloy comprising aluminum and yttrium in an effective amount of less than about 60 percent by weight of the donor alloy; and a donor alloy comprising aluminum and cerium in an effective amount of less than about 40 percent by weight of the donor alloy. If these amounts are exceeded in each case, the homologous temperatures are too low to be compatible with the nickel-base substrate alloy, leading to poor interdiffusion and the possibility that undiffused components of the donor alloy remain at the surfaces or that there is insufficient transfer of aluminum and the modifying element(s) into the surface. Even more preferably, examples include a donor alloy comprising aluminum and chromium in an amount of from about 2 to about 30 percent by weight of the donor alloy; a donor alloy comprising aluminum and platinum in an amount of from about 4 to about 64 percent by weight of the donor alloy; a donor alloy comprising aluminum and palladium in an amount of from about 4 to about 60 percent by weight of the alloy; a donor alloy comprising aluminum and zirconium in an amount of from about 0.1 to about 50 percent by weight of the donor alloy; a donor alloy comprising aluminum plus hafnium in an amount of from about 0.1 to about 69 percent by weight of the donor alloy; a donor alloy comprising aluminum plus yttrium in an amount of from about 0.1 to about to about 60 percent by weight of the donor alloy; and a donor alloy comprising aluminum plus cerium in an amount of from about 0.1 to about 40 percent by weight of the donor alloy. If the amount of the additional element in the donor alloy is less than that indicated, the amount of the additional element is so small as to have no substantial beneficial effect on the properties of the protective region.

The donor alloy may contain more than one additional element by forming the solid donor alloy with the desired multicomponent composition. By comparison, in vapor-phase processes it is very difficult to transfer even one additional element from the source to the coating, and utilizing multiple additional elements is nearly impossible because of the different vaporization and vapor-diffusion rates of the different elements. For example, one type of source used in vapor phase aluminiding is an aluminum-chromium alloy, but the vapor pressure of chromium above such an alloy is negligibly small compared to that of aluminum with the result that almost no chromium is transferred through the vapor phase from the source alloy to the deposited coating.

Melting point depressants may also be added to the donor alloy to lower its melting point. A preferred melting point depressant is silicon in an amount of from about 2 to about 20 weight percent of the donor alloy.

The donor alloy is preferably furnished in a finely divided form, such as a prealloyed powder of the indicated composition. Two or more types of powder may be mixed together to form the donor alloy. For example, the donor alloy may be a mixture of powders in which one type of powder is aluminum alloyed with the additional element(s), and the other type of powder is pure aluminum or another prealloyed powder. Wide ranges of compositions may be obtained in this manner.

The donor alloy is applied on the airfoil internal protected surface 36, numeral 64. The application of the donor alloy is preferably accomplished with two steps. The donor alloy is transported to the internal protected surface 36 to reside on the internal protected surface 36 as a continuous or discontinuous layer or coating of a condensed (that is, liquid and/or solid, but not vapor or gaseous) phase so that the donor alloy in a condensed form is in contact with the internal protected surface, numeral 66. The article and the alloy are heated to the coating temperature that is greater than about 0.7 of the absolute solidus temperature of the donor alloy but is such that the donor alloy remains in the form of a condensed phase contacting the protected surface of the article, numeral 68. The coating temperature must be in excess of about 0.7 of the absolute solidus temperature of the donor alloy to achieve a sufficiently high diffusion rate. The coating temperature may not be so high that the condensed-phase donor alloy vaporizes substantially entirely by boiling or sublimation, or the advantages of using a condensed-phase diffusion process are lost. For the protection of many substrate materials, there is a further limitation placed on the range of coating temperature by metallurgical or processing considerations of the substrate material. In a preferred embodiment, the coating temperature is no greater than about 2100° F., and preferably in a range of from about 1700° F. to about 2100° F., to be compatible with the aging cycle of the nickel-base alloy substrate or with the brazing alloys that may be used in some applications. The steps 66 and 68 occur either simultaneously or sequentially with step 68 following step 66.

The alloy must be in direct physical contact with the internal protected surface 36 as a condensed phase, to allow condensed-phase diffusion of the aluminum and other elements from the donor alloy into the substrate 42. In some other application processes, the source is not in direct physical contact with a surface, and is often several inches away from the surface, so that the element to be deposited reaches the surface by first vaporizing, moving by vapor phase transport to the surface, and then depositing on the surface. In such a case, the elements of an alloy vaporize and diffuse at very different rates, leading to difficulty in controlling the composition of the material deposited onto the surface. In the present case, the diffusion of the elements from the donor alloy into the substrate is by solid-state or liquid-state diffusion. Diffusion rates of elements in the solid and liquid phases are not identical, but they yield a composition reaching the substrate that is much closer to that of the donor alloy than achieved when there is a vaporization and vapor-phase transport of different elements from a coating source.

The condensed phase donor alloy may be transported to the internal protected surface in step 66 by any operable approach. Typically, the donor alloy is mixed with a carrier, and the mixture is applied to the surface to be protected. The preferred approaches are as a foam or as a slurry. In a foam process, the finely divided donor alloy is mixed with a foaming agent such as a polyurethane. The foaming mixture is injected into the internal passages 34. As the foam later collapses upon heating, the finely divided donor alloy is deposited onto the internal protected surfaces 36. In a slurry process, the finely divided donor alloy is mixed with a liquid slurry-former such as a liquid acrylic. The mixture is injected in the liquid state into the internal passages 34 so that the slurry coat s the protected surfaces 36, and the slurry-forming carrier is vaporized and removed to leave the donor alloy deposited onto the protected surfaces 36.

The article and alloy are maintained at the coating temperature for a period of time to permit the donor alloy at the internal protected surface 36 to interdiffuse into the protected surface, numeral 70. The preferred interdiffusing time 70 in the coating temperature range is from about 1 to about 10 hours, producing a protective region 40 as illustrated in FIG. 2.

Optionally, the protected surface to be protected may be cleaned and fluxed by a cleaning agent, such as a halide-containing cleaner, that removes oxides and other impediments to diffusion from the surface of the substrate 42. A cleaning material that is soluble, such as ammonium chloride, ammonium fluoride, or chromium chloride in water, may be dissolved in the solvent and the solution applied to the surfaces, such as by dipping the article into the solution and drying. The result is a dry film of the cleaning material on the surface to be protected. A cleaning material such as aluminum trifluoride may instead be mixed with the carrier and applied to the surface.

The external surfaces 38 are optionally but preferably protected, numeral 72. The external protective layer 46 is first applied, numeral 74. The external protective layer 46 may be applied by any operable approach. For example, the same approach as used in step 64 may be used in step 74. In that case, steps 64 and 74 may be performed simultaneously. Other known diffusion aluminiding techniques may be used in step 74, such as vapor phase aluminiding, above-the-pack aluminiding, and the like. In that case, the step 74 may precede, follow, or be simultaneous with the step 64.

On the other hand, the external protective layer 46 may be an, overlay coating. Where used, the overlay protective layer 46 is preferably of the MCrAlX type. The external protective layer 46 is deposited by any operable technique, such as physical vapor deposition (e.g., sputtering, cathodic arc, electron beam) or thermal spray. The protective layer 46 is preferably from about 0.0005 to about 0.010 inch, most preferably from about 0.002 to about 0.007 inch, thick. In this case, the step 74 may precede, follow, or be simultaneous with the step 64.

The ceramic layer 48 may optionally be applied overlying the external protective layer 46, numeral 76. The ceramic layer 48 is preferably from about 0.003 to about 0.010 inch thick, most preferably about 0.005 inch thick. (FIG. 2 is not drawn to scale.) The ceramic layer 48 is preferably yttria-stabilized zirconia, which is zirconium oxide containing from about 2 to about 20 weight percent, preferably from about 3 to about 8 weight percent, of yttrium oxide. Other operable ceramic materials may be used as well. The ceramic layer 48 may be deposited by any operable technique, such as physical vapor deposition or thermal spray. The step 76, where used, follows step 74, where used, and normally follows step 64.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for protecting a surface of an article comprising the steps of furnishing an article made of a nickel-base alloy;

providing a donor alloy comprising aluminum and at least one other element;

applying the donor alloy onto a protected surface of the article, the step of applying including the steps of contacting the donor alloy to the protected surface of the article, wherein the step of contacting includes the step of forming a foam comprising the donor alloy and conducting the foam to the protected surface, and heating the article and the donor alloy to a coating temperature that is greater than about 0.7 of the absolute solidus temperature of the donor alloy but is such that the donor alloy remains in the form of a condensed phase contacting the protected surface of the article, and thereafter interdiffusing the donor alloy into the protected surface of the article.

2. The method of claim 1, wherein the step of furnishing an article includes the step of furnishing a component of a gas turbine engine.

3. The method of claim 1, wherein the step of furnishing an article includes the step of furnishing a gas turbine airfoil.

4. The method of claim 1, wherein the protected surface of the article is an internal surface of the article.

5. The method of claim 1, wherein the protected surface of the article is an external surface of the article.

6. The method of claim 1, wherein the protected surface of the article comprises an internal surface of the article and an external surface of the article.

7. The method of claim 1, wherein the step of providing includes the step of providing the donor alloy of aluminum and at least one other element selected from the group consisting of chromium, zirconium, hafnium, yttrium, cerium, platinum, and palladium, and mixtures thereof.

8. The method of claim 1, wherein the step of providing includes the step of providing the donor alloy comprising aluminum and chromium in an amount of less than about 30 percent by weight of the donor alloy.

9. The method of claim 1, wherein the step of providing includes the step of providing the donor alloy comprising aluminum and platinum in an amount of less than about 64 percent by weight of the donor alloy.

10. The method of claim 1, wherein the step of providing includes the step of providing the donor alloy comprising aluminum and palladium in an amount of less than about 60 percent by weight of the donor alloy.

11. The method of claim 1, wherein the step of providing includes the step of providing a melting-point depressant in the donor alloy.

12. The method of claim 1, wherein the step of interdiffusing includes the step of interdiffusing the donor alloy into the protected surface for a period of from about 1 to about 10 hours.

13. The method of claim 1, wherein the step of heating includes the step of heating the article and the donor alloy to a temperature of from about 1700° F. to about 2100° F.

14. The method of claim 1, wherein the donor alloy comprises the solid state at the coating temperature.

15. The method of claim 1, wherein the donor alloy comprises the liquid state at the coating temperature.

16. The method of claim 1, wherein the donor alloy contains at least two other elements.

17. A method for protecting a surface of an article comprising the steps of furnishing an article made of a nickel-base alloy and comprising a component of a gas turbine engine having an internal passage in communication with an exterior of the article, the internal passage having an internal protected surface;

providing a donor alloy comprising aluminum and at least one other element selected from the group consisting of chromium in an amount of less than about 30 percent by weight of the donor alloy, zirconium, hafnium, platinum, and palladium, and mixtures thereof;

applying the donor alloy onto the internal protected surface of the article, the step of applying including the steps of forming a foam comprising the donor alloy and conducting the foam to the internal protected surface, contacting the donor alloy to the internal protected surface of the article, and heating the article and the donor alloy to a coating temperature that is greater than about 0.7 of the absolute solidus temperature of the donor alloy but is such that the donor alloy remains in the form of a condensed phase contacting the protected surface of the article, and thereafter interdiffusing the donor alloy into the internal protected surface of the article.

18. The method of claim 17, wherein the article further comprises an external surface, and wherein the method includes an additional step of applying an external protective coating to the external surface.

19. The method of claim 17, wherein the step of providing includes the step of providing the donor alloy comprising aluminum and platinum in an amount of less than about 64 percent by weight of the donor alloy.

20. The method of claim 17, wherein the step of providing includes the step of providing the donor alloy comprising aluminum and palladium in all amount of less than about 60 percent by weight of the donor alloy.

21. The method of claim 17, wherein the step of providing includes the step of providing a melting-point depressant in the donor alloy.

22. The method of claim 17, wherein the donor alloy contains at least two other elements.

* * * * *